US008626189B2

(12) United States Patent
Silny et al.

(10) Patent No.: US 8,626,189 B2
(45) Date of Patent: Jan. 7, 2014

(54) POSITION OPTIMIZATION (75) Inventors: John F. Silny, Playa Vista, CA (US);
Mark R. Skidmore, Long Beach, CA (US)

(73) Assignee: Raytheon Company, Waltham, MA (US)

(*) Notice: Subject to any disclaimer, the term of this patent is extended or adjusted under 35 U.S.C. 154(b) by 75 days.

(21) Appl. No.: 13/312,122

(22) Filed: Dec. 6, 2011

(65) Prior Publication Data

US 2013/0143591 A1 Jun. 6, 2013

(51) Int. Cl.
*H04W 24/00* (2009.01)
(52) U.S. Cl.
USPC ............... 455/456.1; 455/457; 455/422.1
(58) Field of Classification Search
USPC .............. 455/456.1–457; 701/412, 468–470; 342/450–465
See application file for complete search history.

(56) References Cited

U.S. PATENT DOCUMENTS

| 5,202,829 | A | 4/1993 | Geier |
| 5,317,321 | A | 5/1994 | Sass |
| 5,422,816 | A | 6/1995 | Sprague et al. |
| 6,031,490 | A | 2/2000 | Forssen et al. |
| 6,741,209 | B2 | 5/2004 | Lee |
| 6,922,635 | B2 | 7/2005 | Rorabaugh |
| 7,084,809 | B2 | 8/2006 | Hockley, Jr. et al. |
| 7,292,186 | B2 | 11/2007 | Miller et al. |
| 7,317,925 | B2 | 1/2008 | Niu et al. |
| 7,839,916 | B1 | 11/2010 | Luecke et al. |
| 7,843,862 | B2 | 11/2010 | Garg et al. |
| 2008/0208444 | A1* | 8/2008 | Ruckart ................. 701/200 |
| 2010/0156715 | A1 | 6/2010 | Kang et al. |
| 2010/0223332 | A1 | 9/2010 | Maxemchuk et al. |
| 2010/0279706 | A1* | 11/2010 | Dicke .................. 455/456.1 |

FOREIGN PATENT DOCUMENTS

WO 2004/008171 A1 1/2004

OTHER PUBLICATIONS

Rockwell Collins Product Catalog—Government; JTIDS Joint Tactical Information Distribution System; http://www.rockwellcollins.com; last visited Apr. 28, 2011.
Tactical Tactics, Techniques, and Procedures for the Enhanced Position Location Reporting System (EPLRS); Field Manual 24-41; Headquarters, Department of the Army; Washington, DC; Jul. 1999.

* cited by examiner

*Primary Examiner* — Chuong A Ngo
(74) *Attorney, Agent, or Firm* — Pierce Atwood LLP; Joseph M. Maraia (57) ABSTRACT

Described are computer-based methods and apparatuses, including computer program products, for position determination. In some examples, the method includes receiving, by a device, position information from at least one other device. The method further includes modifying, by the device, an initial position based on the position information from the at least one other device to form a refined position. The method further includes transmitting, by the device, the refined position to the at least one other device. The method further includes revising, by the device, the refined position based on refined position information received from the at least one other device to form a final position.

10 Claims, 6 Drawing Sheets

POSITION OPTIMIZATION

BACKGROUND

Positioning systems generally utilize natural or manmade signals to determine location. These positioning systems typically determine the location for the individual positioning system. However, these positioning systems are subject to errors in the position determination due to interference and limitations in the architecture/components when using an individual positioning system. Thus, a need exists in the art for improved position optimization systems.

SUMMARY

Position optimization methods and apparatuses include technology that, generally, enables collaboration between cooperative users to generate a better absolute position estimate for each user utilizing relative positions shared among a group of users. The technology can include an optimization of each user's estimated positions in 3-dimensional space using relative position information from the group of users. The technology exchanges relative position information and/or identification information amongst the group of users and the computing devices of the group of users, collectively or individually, can refine the absolute positions of the users based on the exchanged relative and/or absolute position information.

One approach is a system that provides position optimization. The system includes a first device and a second device. The first device includes a first position determination module configured to determine position information associated with the first device, a first communication module configured to transmit the position information associated with the first device, transmit optimized position information associated with the first device, receive position information associated with the second device, and receive optimized position information associated with the second device, and a first position optimization module configured to automatically and iteratively optimize the position information associated with the first device based on the position information associated with the second device and the optimized position information associated with the second device. The second device includes a second position determination module configured to determine the position information associated with the second device, a second communication module configured to transmit the position information associated with the second device, transmit the optimized position information associated with the second device, receive the position information associated with the first device, and receive the optimized position information associated with the first device, and a second position optimization module configured to automatically and iteratively optimize the position information associated with the second device based on the position information associated with the first device and the optimized position information associated with the first device.

Another approach is a method for optimizing a position determination. The method includes (a) receiving, by a device, position information from at least one other device; (b) modifying, by the device, an initial position based on the position information from the at least one other device to form a refined position; (c) transmitting, by the device, the refined position to the at least one other device; and (d) revising, by the device, the refined position based on refined position information received from the at least one other device to form a final position.

Another approach is a computer program product for optimizing a position determination. The computer program product is tangibly embodied in an information carrier. The computer program product includes instructions being operable to cause a data processing apparatus to: receive position information from at least one other device; modify an initial position based on the position information from the at least one other device to form a refined position; transmit the refined position to the at least one other device; and revise the refined position based on refined position information received from the at least one other device to form a final position.

In other examples, any of the approaches above can include one or more of the following features.

In some examples, the system includes a plurality of other devices, each of the plurality of other devices including a position optimization module configured to automatically and iteratively optimize position information based on received position information and received optimized position information, wherein the received position information and the received optimized position information received from the first device, the second device, the plurality of other devices, or any combination thereof.

In other examples, the optimized position information associated with the first device includes optimized position locations of the first device and the second device and the optimized position information associated with the second device includes optimized second position locations of the first device and the second device.

In some examples, the first position optimization module is further configured to automatically and iteratively optimize the position information associated with the first device based on a plurality of optimized position information, the plurality of optimized position information received from a plurality of devices; and wherein the second position optimization module further configured to automatically and iteratively optimize the position information associated with the second device based on the plurality of optimized position information.

In other examples, the first device is a first mobile device and the second device is a second mobile device.

In some examples, the method further includes (e) determining, by the device, if the refined position is less than a position tolerance; and (f) repeating, by the device, steps (c), (d), and (e) based on the determination in step (e).

In other examples, the method further includes (a-2) receiving, by a second device, additional position information from the at least one other device or the first device; (b-2) modifying, by the second device, an initial position of the second device based on the additional position information from the at least one other device or the first device to form a refined position of the second device; (c-2) transmitting, by the second device, the refined position of the second device to the other plurality of devices or the first device; and (d-2) revising, by the second device, the refined position based on additional refined position information received from the at least one other device or the first device to form a final position.

In other examples, the method further includes separating, by the device, the modifying steps (b) and (b-2) and the revising steps (d) (d-2) based on resource availability of a plurality of device; and transmitting, by the device, the separation of the modifying steps and the revising steps to the plurality of devices.

In some examples, the resource availability includes processor availability, memory availability, network availability, power availability, or any combination thereof.

In other examples, the position information includes a position of the at least one other device, a range between the at least one other device and the device, a directional vector between the at least one other device and the device, or any combination thereof.

The position optimization techniques described herein can provide one or more of the following advantages. An advantage of the technology is that the position optimization described herein uses position collaboration between group users to refine and improve individual absolute position estimates, thereby increasing the efficiency of the positioning systems and increasing the accuracy of the position determination. Another advantage of the technology is that the position optimization described herein can use other positioning systems (e.g., GPS) and optimizes the position determination from the other positioning systems, thereby increasing the accuracy of the technology and decreasing the cost to deploy the technology.

Another advantage of the technology is that the position optimization described herein can use localized or distributed processing to balance resource usage, thereby increasing the flexibility of the technology across multiple platforms (e.g., mobile devices, fixed-position devices, battery-operated devices, etc.). Another advantage of the technology is that the position optimization described herein can be utilized on multiple, non-stationary (dynamic), non-homogenous platforms, thereby increasing the available environments for use of the technology and decreasing the implementation costs of the technology.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The position optimization method and apparatus includes technology that, generally, optimizes a group of user's estimated positions in 3-dimensional space (e.g., absolute position in 3-dimensional space) using relative position information from a group of users (i.e., where is a user relative to the other users). The technology exchanges relative position information and/or identification information amongst the group of users and the computing devices of the group of users, collectively or individually, can refine the absolute positions of the users (i.e., where is a user in a global coordinate system) based on the exchanged relative and/or absolute position information. In other words, the technology can determine the associated computing devices initial position, refine the initial position to form a refined position based on the exchanged position information, and refine the refined position to form a final position based on the refined positions exchanged among the group of users. The technology advantageously utilizes position information from a group of users, thereby reducing the complexity and cost associated with correcting errors and uncertainty in global positioning systems and reducing the potential for interference to the global positioning systems. The technology can also determine a user's absolute position when that user only has relative position knowledge to one or more users and does not have access to a global positioning system.

The technology can refine individual absolute position estimates (also referred to an initial position) using group knowledge of relative location (i.e., where is a computing device relative to the other computing devices) to improve the absolute position determination in 3-dimensional space, thereby advantageously increasing the accuracy of the positioning systems. The technology can be utilized to improve the accuracy of other positioning systems and/or when other positioning systems are inaccurate and/or unavailable via the collaboration among the group of users.

The technology generally utilizes a positioning system (e.g., GPS, EGNOS, etc.) and a set of computing devices. Each of the computing devices in the set of computing devices is associated with a member within a group of collaborative users (also referred to as group of users). Each of the computing devices includes a positioning system receiver (e.g., receives information to determine absolute position information), a user-to-user communication transceiver (e.g., receives and/or transmits position information), and a processor for determining and optimizing an absolute position of the computing device. In some examples, one or more of the computing devices in the set of computing devices include a positioning system receiver and a user-to-user communication transceiver and another computing device determines and optimizes the absolute position for the one or more computing devices. In other examples, one or more of the computing devices in the set of computing devices include a user-to-user communication transceiver and another computing device estimates and optimizes the absolute position for the one or more computing devices.

For example, in operation, each of the user's computing devices determines an optimized position estimate of the computing device utilizing absolute and relative position information from the other cooperative computing devices within the group. The user's computing device determines a relative position with respect to some or all other members of the group (e.g., computing device A is 10 meters from computing device B, 45 meters southeast of computing device C, etc.). In general, the relative position between users is determined in a three dimensional space. The relative position information can be distance only (e.g., 10 meters, 1,000 meters, etc.) or a directional connected graph (e.g., range, azimuth angle, and elevation angle). Each user's computing device can iteratively refine the respective absolute position estimate based on the relative and absolute positions of the group of users. For example, the user's computing device can begin with an initial position location, optimize the initial position location to generate a refined position location, and optimize the refined position location to generate a final position location.

As another example, in operation, the technology generally updates absolute position estimates of user's computing devices based on the relative positions between the computing devices within a group. In other words, the technology determines measured absolute position estimates for each computing device and calculates, by one or more of the computing devices, relative positions between the computing devices. The technology then compares the calculated relative positions to the measured relative positions. The technology minimizes an error between the calculated and measured relative positions using a variety of methods that update the absolute position estimates such the absolute position estimates are better matches to the measured relative positions. The error minimization methods can include: (1) iterative refinement, and/or (2) group constrained.

In some examples, each of the computing devices determines an optimized position estimate for each member of the group using an iterative refinement method. The iterative refinement process can require a plurality of iterations between the group members to determine the respective absolute positions for each of the group members in which the absolute position of one or more members is updated sequentially. The relative position information is advantageously used to refine absolute position estimates for all users that is more accurate than any individual solution, thereby increasing the efficiency of the positioning aspects of the technology.

In other examples, one or a subset of the user's computing devices determines the absolute position for each of the group members via group constrained processing. In this example, new absolute positions for all users are simultaneously obtained. In some examples, each of the user's computing devices determines the absolute position for each of the group members via the group constrained processing. The group constrained processing is utilized to determine the absolute positions for all or part of the group members at the same time. In other words, in the group constrained processing, a best absolute position for a subset or all of the group members is determined simultaneously.

In some examples, the processing (e.g., iterative refinement, group constrained, etc.) can either be localized to a single computing device that provides a solution to all members within the group and/or distributed amongst a subset or all computing devices that collaborate to solve for the optimized solution. For example, a fixed computing device attached to a non-battery power source processes all parts of the position optimization for all members. As another example, the processing of the parts of the position optimization is split between the computing devices with the largest battery lives (e.g., 90% battery life capacity remaining, 60 watt-hours, etc.) and/or any other computing resource (e.g., available memory, fastest processor, etc.).

Figure 1:
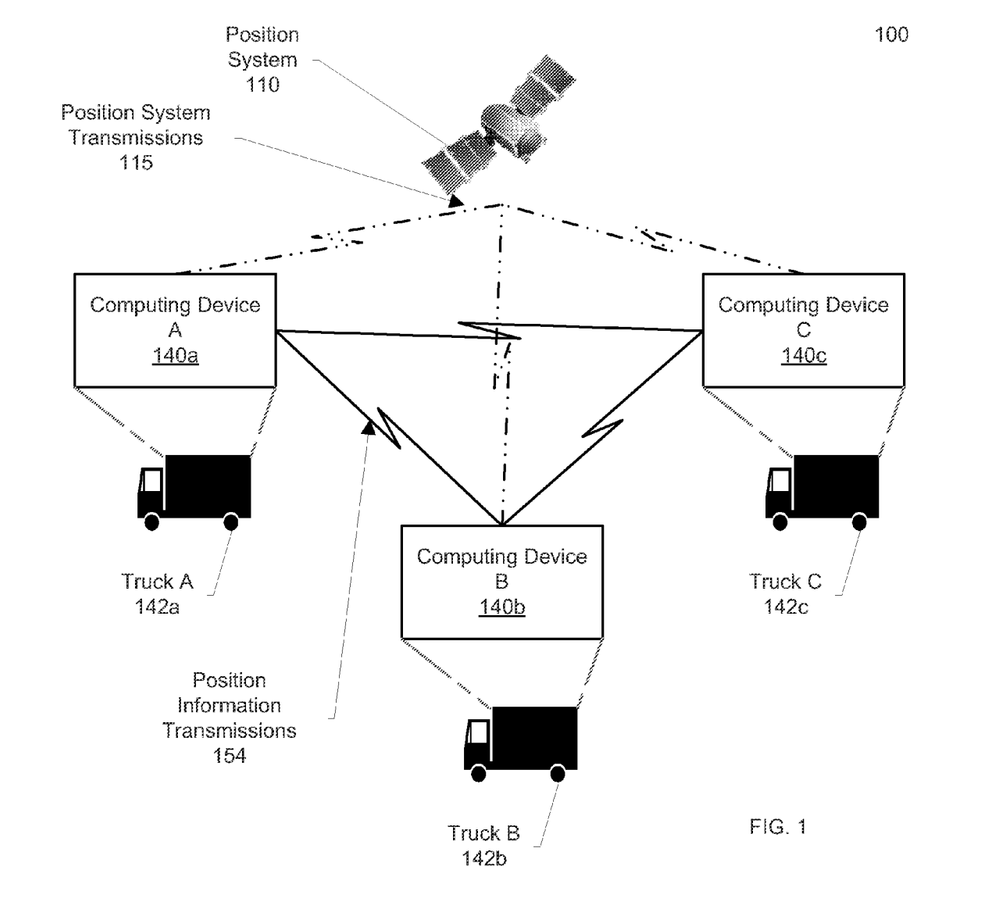
FIG. 1 is a diagram of an exemplary position optimization environment.

FIG. 1 is a diagram of an exemplary position optimization environment 100. The environment 100 includes a position, navigation, and timing (PNT) system 110 (e.g., GPS, EGNOS, etc.), and a plurality of computing devices A 140a, B 140b, and C 140c. The computing devices A 140a, B 140b, and C 140c (generally referred to as computing device 140) are mounted within platforms A 142a, B 142b, and C 142c (generally referred to as platform 142), respectively. The PNT system 110 sends signals (in this example, position system transmissions 115) to the computing devices 140.

Each computing device 140 determines an absolute position estimate (also referred to as the initial position location) of the platform 142 based on the transmitted signals 115 (e.g., a global positioning signal (GPS) signal, etc.). Each of the computing devices 140 transmits the estimated absolute position information and/or identification information to the other computing devices 140. The estimated position information includes an estimated absolute position of truck 142 and/or a measured relative position (e.g., relative position to the other computing devices 140). Each of the computing devices 140 revise the estimated absolute position information based on the shared position information from the group to form a revised position location, if the revision process is not complete, or final position location, if the revision process is complete. The revising process advantageously enables the individual absolute position estimates to be refined based on the group's relative position knowledge. Although FIG. 1 illustrates the platforms 142 as trucks, the technology can be utilized by any type of platform (e.g., aircraft, spacecraft, ground vehicle, ship, person, etc.).

Figure 2A:
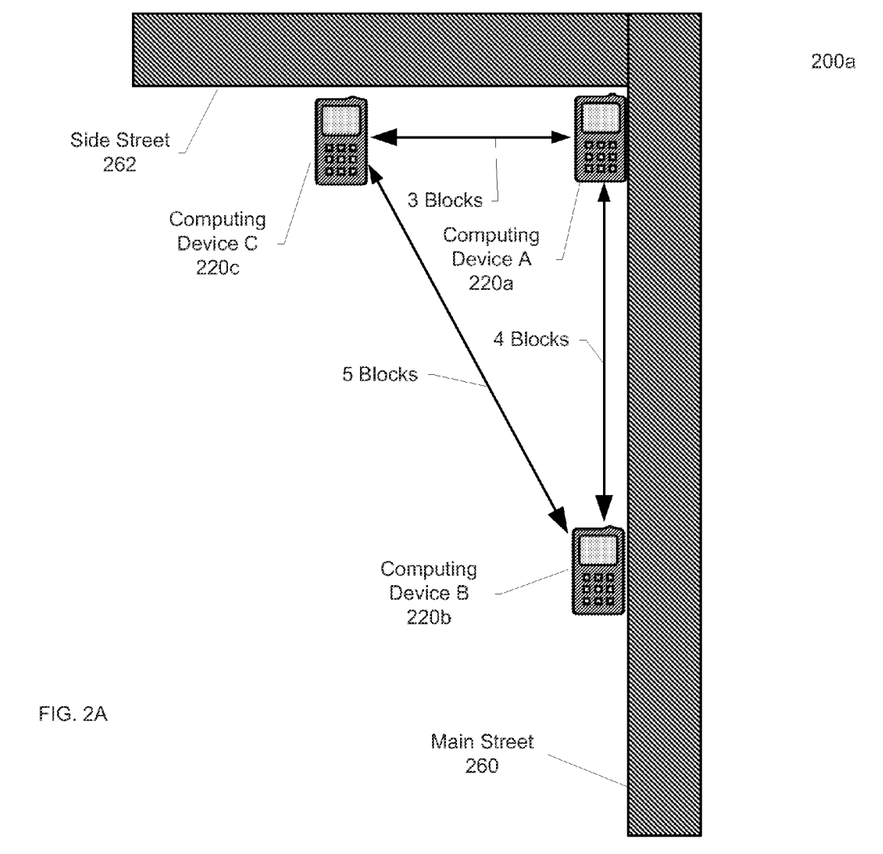
FIG. 2A illustrates an exemplary map of locations of computing devices.

FIG. 2A illustrates an exemplary map of locations of computing devices A 220a, B 220b, and C 220c. As illustrated in FIG. 2A, the computing device A 220a is located on Main Street (260), the computing device B 220b is located on Main Street (260), and the computing device C 220c is located on Side Street (262).

Figure 2B:
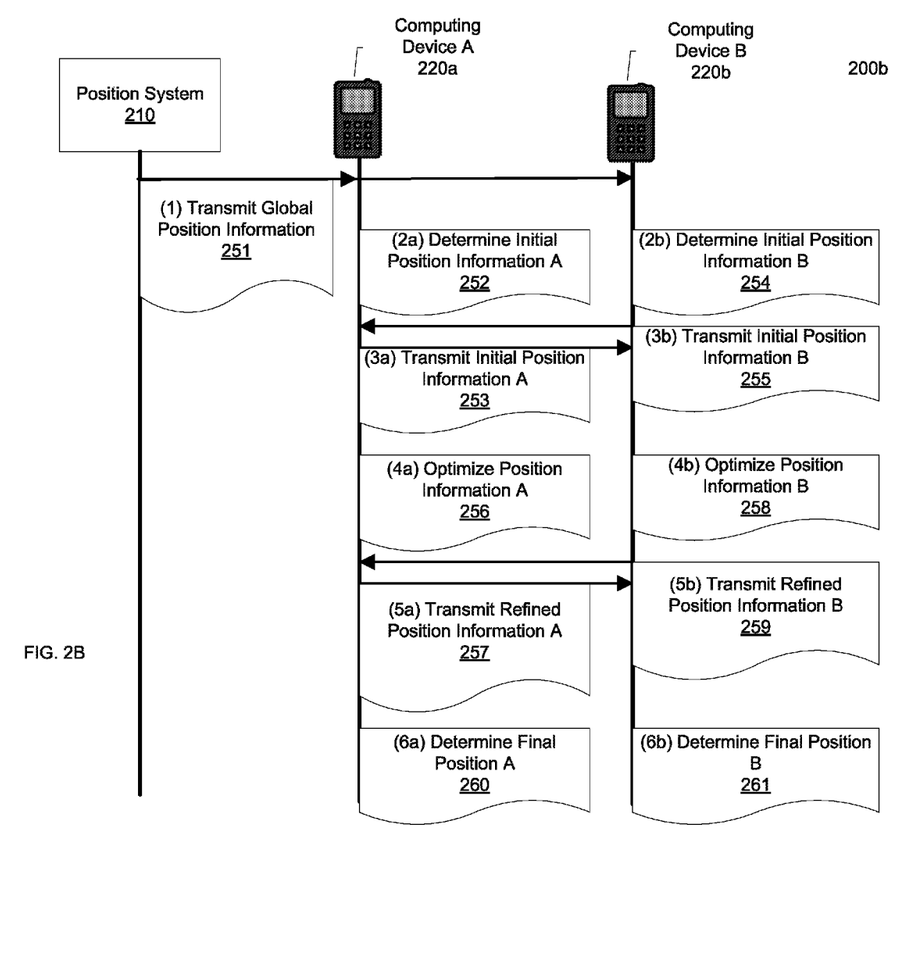
FIG. 2B is a process diagram of an exemplary position optimization method.

FIG. 2B is a process diagram 200b of an exemplary position optimization method. A PNT system 210 transmits (251) global position signals to the computing devices A 220a, B 220b, and C 220c (not shown in FIG. 2B). Although FIG. 2A illustrates the three computing devices A 220a, B 220b, and C 220c, for illustrative purposes, FIG. 2B includes the two computing devices A 220a and B 220b. The computing device A 220a determines (252) initial position information (e.g., estimated absolute position, relative position to other users, etc.) based on the global position signals and transmits (253) the initial position information of the computing device A 220a to the computing device B 220b. The computing device B 220b determines (254) initial position information of the computing device B 220b and transmits (255) the initial position information of the computing device B 220b to the computing device A 220a. Table 1 illustrates exemplary position information.

TABLE 1

Exemplary Position Information

| Computing Device | Absolute Position Estimate - (X, Y) position in a global coordinate system | Relative Position |
| --- | --- | --- |
| A 220a | (20, 24) | North - 4 units from B 220b; East - 3 units from C 220c |
| B 220b | (20, 20) | South - 4 units from A 220a; 36.9 degrees East of South - 5 units from C 220c |
| C 220c | (17, 24) | West - 3 units from A 220a; 36.9 degrees West of North - 5 units from B 220b |

The computing device A 220a refines (256) the position information of the computing device A 220a based on the position information of the computing device B 220b and transmits (257) the refined position information of the computing device A 220a to the computing device B 220b. The computing device B 220b refines (258) the position information of the computing device B 220b based on the position information of the computing device A 220a and transmits (259) the refined position information of the computing device B 220b to the computing device A 220a. The refining process can, for example, repeat until a best or optimized solution is found. The final solution can be referred to as the optimized position. Tables 2-3 illustrate exemplary optimized position information in two iterations via the refined iterative process. As illustrated in FIG. 2A, the optimized position information for the computing device C 220c is revised based on the relative positions of the computing devices. In this example, the three computing devices A 220a, B 220b, and C 220c form a right triangle (in this example, the right triangle is determined based on the relative positions) and based on the relative positions between users (e.g., directional vectors, distance, etc.), the refined position of the computing device C 220c is revised.

TABLE 2

Exemplary Position Information (First Iteration)

| Computing Device | Initial Position Estimate - (X, Y) position in a global coordinate system | Measured Relative Position | Computed Relative Position from Estimated Absolute Positions |
|---|---|---|---|
| A 220a | 1 Main Street (20, 24) | North - 4 units from B 220b; East - 3 units from C 220c | North - 4 units from B 220b; East - 4 units from C 220c |
| B 220b | 5 Main Street (20, 20) | South - 4 units from A 220a; 36.9 degrees East of South - 5 units from C 220c | South - 4 units from A 220a; 45 degrees East of South - 5 units from C 220c |
| C 220c | 5 Side Street (20, 16) | West - 3 units from A 220a; 36.9 degrees West of North - 5 units from B 220b | West - 4 units from A 220a; 45 degrees West of North - 5 units from B 220b |

TABLE 3

Exemplary Position Information (Second Iteration)

| Computing Device | Refined Position Estimate - (X, Y) position in a global coordinate system | Measured Relative Position | Computed Relative Position from Estimated Absolute Positions |
|---|---|---|---|
| A 220a | 1 Main Street (20, 24) | North - 4 units from B 220b; East - 3 units from C 220c | North - 4 units from B 220b; East - 3 units from C 220c |
| B 220b | 5 Main Street (20, 20) | South - 4 units from A 220a; 36.9 degrees East of South - 5 units from C 220c | South - 4 units from A 220a; 36.9 degrees East of South - 5 units from C 220c |
| C 220c | 5 Side Street (20, 17) | West - 3 units from A 220a; 36.9 degrees West of North - 5 units from B 220b | West - 3 units from A 220a; 36.9 degrees West of North - 5 units from B 220b |

The computing device A 220a determines (260) an optimized final position estimate (also referred to as absolute position estimate) of the computing device A 220a based on the refined position information of the computing device A 220a and/or multiple refinement iterations. The computing device B 220b determines (261) an optimized final position estimate (also referred to as absolute position estimate) of the computing device B 220b based on the refined position information of the computing device B 220b and/or multiple refinement iterations. Table 4 illustrates exemplary final position information. In some examples, the optimized position information is the absolute position information.

TABLE 4

Exemplary Final Position Information

| Computing Device | Final Position Estimate |
|---|---|
| A 220a | 1 Main Street (20, 24) |
| B 220b | 5 Main Street (20, 20) |
| C 220c | 5 Side Street (20, 17) |

In other examples, the computing devices A 220a, B 220b, and C 220c continue optimizing the position information until a position tolerance is satisfied (e.g., the optimized estimated positions each agree to within 1 meter of the measured relative positions, etc.). For example, the computing devices A 220a, B 220b, and C 220c continue optimizing the position information until a position tolerance is consistent with data measurements to within some tolerance. In some examples, the error information used to optimize the group's positions can be represented in a variety of different figures of merit (e.g., mean square error, absolute difference error, etc.). In some examples, the processing of the optimization (256 and 258) of the position information is separated among one or more of the computing devices A 220a, B 220b, and C 220c. Tables 5-6 illustrate exemplary processing splits among computing devices.

TABLE 5

Exemplary Position Information (Exemplary Processing Split)

| User | Where Processing Occurs to Determine User's Position |
|---|---|
| A 220a | 100% by A 220a |
| B 220b | 50% by A 220a and 50% by C 200c |
| C 220c | 100% by C 220c |

TABLE 6

Exemplary Position Information (Another Exemplary Processing Split)

| User | Where Processing Occurs to Determine User's Position |
|---|---|
| A 220a | 100% by A 220a |
| B 220b | 100% by A 220a |
| C 220c | 100% by A 220a |

Although FIGS. 2A and 2B illustrate three computing devices, the technology described herein can utilize any number of computing devices (e.g., ten computing devices, twenty computing devices, etc.).

Figure 3:
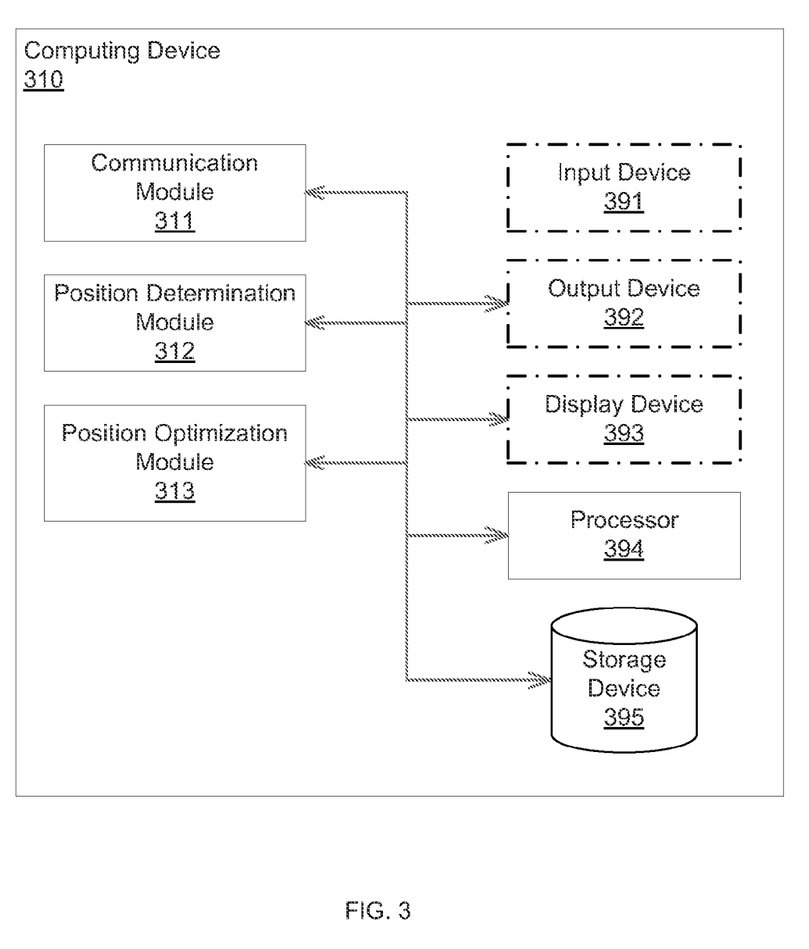
FIG. 3 is a diagram of an exemplary computing device.

FIG. 3 is a diagram of a computing device 310. The computing device 310 includes a communication module 311, a position determination module 312, a position optimization module 313, an input device 391, an output device 392, a display device 393, a processor 394, and a storage device 395. The modules and devices described herein can, for example, utilize the processor 394 to execute computer executable instructions and/or include a processor to execute computer executable instructions (e.g., an encryption processing unit, a field programmable gate array processing unit, etc.). It should be understood that the computing device 310 can include, for example, other modules, devices, and/or processors known in the art and/or varieties of the illustrated modules, devices, and/or processors.

The communication module 311 communicates information to/from the computing device 310. The communication module 311 transmits position information associated with the computing device 310, transmits optimized position information (e.g., refined position information, final position information) associated with the computing device 310, receives position information from other computing devices (e.g., initial position information), and/or receives optimized position information (e.g., refined position information, final position information) from the other computing devices.

The position determination module 312 determines initial position information (also referred to as position information) associated with the computing device 310. The position determination module 312 can, for example, utilize any type of positioning system and/or technique to determine the initial position information.

The position optimization module 313 automatically and iteratively optimizes the position information based on the position information from other computing devices and the optimized position information from other computing devices. In some examples, the position optimization module 313 automatically and iteratively optimizes the position information based on a plurality of optimized position information. In some examples, the position optimization module 313 automatically and iteratively optimizes the position information based on other information (e.g., additional positioning system information, user input, etc.). The plurality of optimized position information is received from a plurality of computing devices.

In other examples, the computing device is a mobile computing device. In some examples, the computing device is a fixed computing device. In other examples, one or more of the other computing devices are mobile computing devices and/or fixed computing devices.

The input device 391 receives information associated with the computing device 310 (e.g., instructions from a user, instructions from another computing device, etc.) from a user (not shown) and/or another computing system (not shown). The input device 391 can include, for example, a keyboard, a scanner, etc. The output device 392 outputs information associated with the radar data processing system 310 (e.g., information to a printer (not shown), information to a speaker, etc.).

The display device 393 displays information associated with the computing device 310 (e.g., status information, configuration information, etc.). The processor 394 executes the operating system and/or any other computer executable instructions for the computing device 310 (e.g., executes applications, etc.).

The storage device 395 stores position information and/or optimized position information. The storage device 395 can store information and/or any other data associated with the computing device 310. The storage device 395 can include a plurality of storage devices and/or the computing device 310 can include a plurality of storage devices (e.g., a position storage device, an absolute satellite position device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
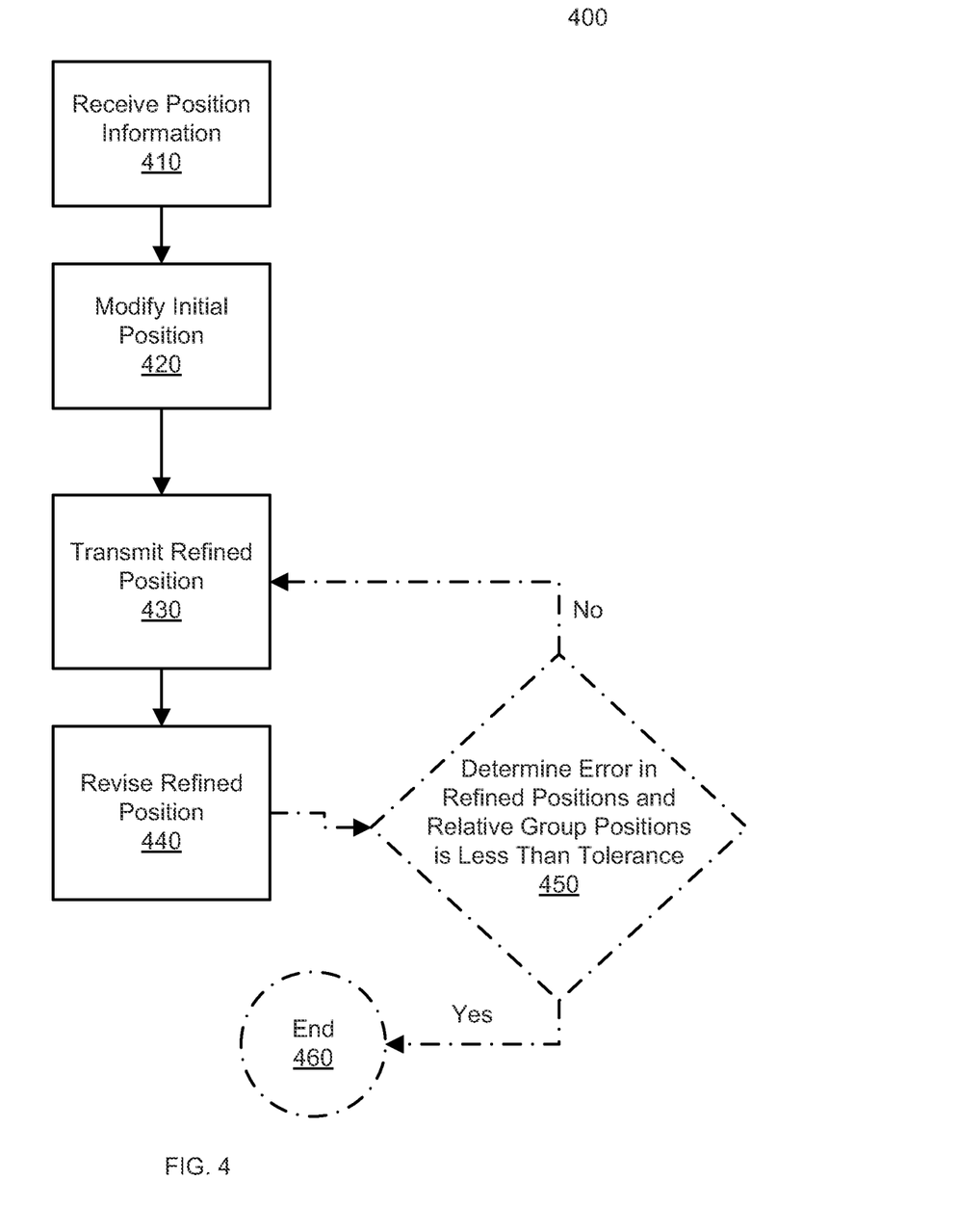
FIG. 4 is a flowchart of another exemplary position optimization method.

FIG. 4 is a flowchart of an exemplary position optimization method utilizing, for example, the computing device 310 of FIG. 3. The communication module 311 receives (410) position information from at least one other device (e.g., a fixed computing device, a mobile computing device, etc.). The position determination module 312 modifies (420) an initial position based on the position information from the at least one other device. The communication module 311 transmits (430) the refined position to the at least one other device. The position optimization module 313 revises (440) the refined position based on refined position information received from the at least one other device. In other words, the computing device 310 determines an initial position and revises the initial position to form a refined position. In some examples, the refined position can be the final position of the computing device 310. In other examples, the computing device 310 revises the refined position to form a final position.

In some examples, the position optimization module 313 determines (450) if the error in the refined positions and the relative group positions is less than a tolerance. If the error is not less than the tolerance, the transmitting (430), the revising (440), and the determination (450) steps are repeated by the respective modules. If the error is less than the tolerance, the processing ends (460).

Figure 5:
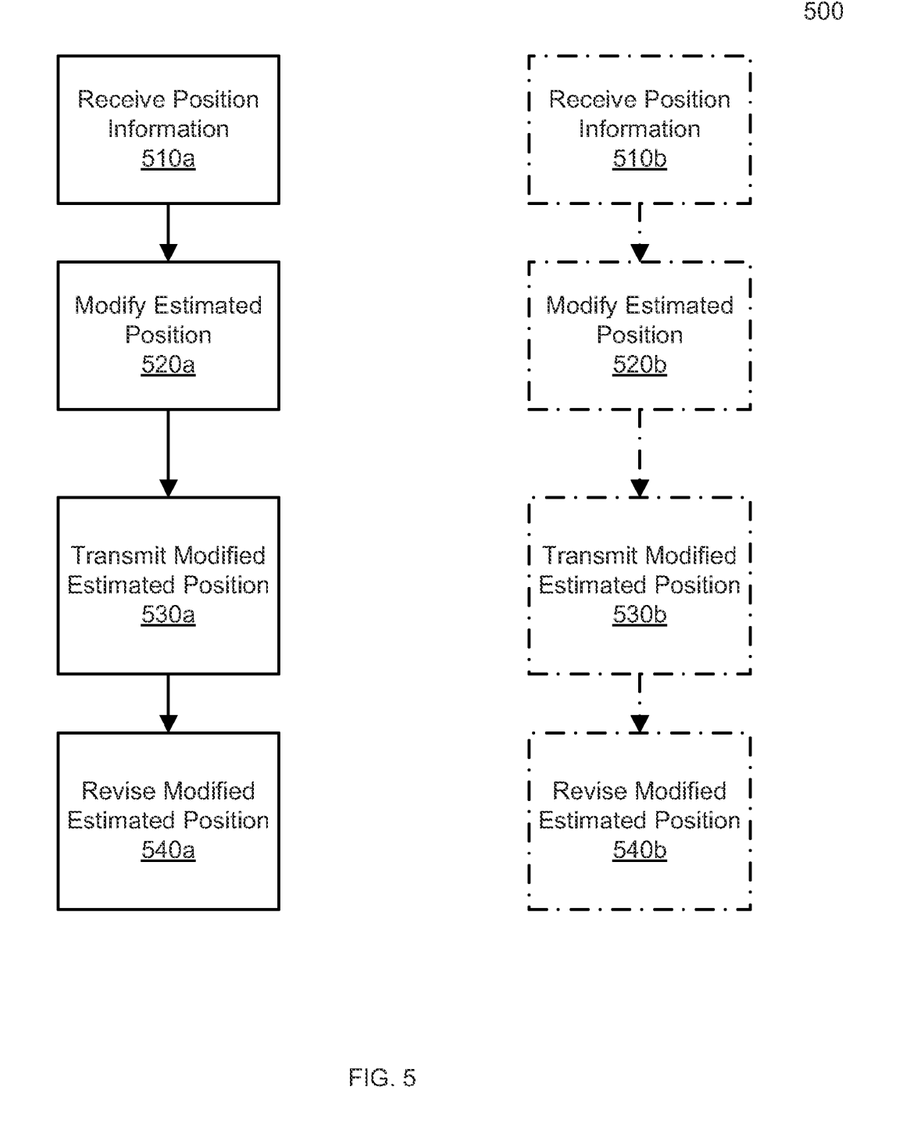
FIG. 5 is a flowchart of another exemplary position optimization method.

FIG. 5 is a flowchart of an exemplary position optimization method utilizing, for example, the computing device 310 of FIG. 3. The communication module 311 receives (510a) position information (e.g., initial position information) from at least one other device (e.g., a fixed computing device, a mobile computing device, etc.). The position determination module 312 modifies (520a) an estimated position (e.g., initial position information) based on the position information from the at least one other device. The communication module 311 transmits (530a) the modified estimated position (also referred to as the refined position location) to the at least one other device. The position optimization module 313 revises (540a) the modified estimated position based on modified position information received from the at least one other device to form a final position location.

In some examples, another computing device performs the steps for position optimization (in other words, a second computing device). The communication module of the other computing device receives (510b) position information (e.g., initial position information) from at least one other device (e.g., a fixed computing device, a mobile computing device, etc.). The position determination module of the other computing device modifies (520b) an estimated position (e.g., initial position information) based on the position information from the at least one other device. The communication module of the other computing device transmits (530b) the modified estimated position (also referred to as the refined position location) to the at least one other device. The position optimization module of the second computing device revises (540b) the modified estimated position based on modified position information received from the at least one other device to form a final position location.

In some examples, the position optimization module (313, of the second computing device, or of another computing device) separates the modifying steps (520a and 520b) and the revising steps (540a and 540b) based on resource availability of a plurality of devices. The communication module (313, of the second computing device, or of another computing device) transmits the separation of the modifying steps and the revising steps to the plurality of devices.

In other examples, the resource availability includes processor availability (e.g., 90% available, 20% utilized, etc.), memory availability (e.g., 70% available, 30% utilized, etc.), network availability (e.g., 60% available, 50% utilized, etc.), power availability (e.g., battery powered, 90% available battery life, etc.), and/or any other type of resource constraints associated with the computing devices. In some examples, the position information includes a position of the at least one other device, a range between the at least one other device and the device (e.g., four miles, 3222 meters, etc.), a directional vector between the at least one other device and the device (e.g., due East at 1231 meters, 45 degree angle at 65 meters, etc.), and/or any other type of position information.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A position optimization system, the system comprising:
a first device, the first device comprising:
  a first position determination module configured to determine position information associated with the first device,
  a first communication module configured to transmit the position information associated with the first device, transmit optimized position information associated with the first device, receive position information associated with the second device, and receive optimized position information associated with the second device, and
  a first position optimization module configured to automatically and iteratively optimize the position information associated with the first device based on the position information associated with the second device and the optimized position information associated with the second device; and
a second device, the second device comprising:
  a second position determination module configured to determine the position information associated with the second device,
  a second communication module configured to transmit the position information associated with the second device, transmit the optimized position information associated with the second device, receive the position information associated with the first device, and receive the optimized position information associated with the first device, and
  a second position optimization module configured to automatically and iteratively optimize the position information associated with the second device based on the position information associated with the first device and the optimized position information associated with the first device.

2. The system of claim 1, further comprising:
a plurality of other devices, each of the plurality of other devices comprising:
  a position optimization module configured to automatically and iteratively optimize a position information based on received position information and received optimized position information, wherein the received position information and the received optimized position information received from the first device, the second device, the plurality of other devices, or any combination thereof.

3. The system of claim 1, wherein the optimized position information associated with the first device comprises optimized position locations of the first device and the second device and the optimized position information associated with the second device comprises optimized second position locations of the first device and the second device.

4. The system of claim 1, wherein the first position optimization module further configured to automatically and iteratively optimize the position information associated with the first device based on a plurality of optimized position information, the plurality of optimized position information received from a plurality of devices; and
wherein the second position optimization module further configured to automatically and iteratively optimize the position information associated with the second device based on the plurality of optimized position information.

5. The system of claim 1, wherein the first device is a first mobile device and the second device is a second mobile device.

6. A method for optimizing a position determination, the method comprising:
(a) receiving, by a device, position information from at least one other device;
(b) modifying, by the device, an initial position based on the position information from the at least one other device to form a refined position;
(c) transmitting, by the device, the refined position to the at least one other device;
(d) revising, by the device, the refined position based on refined position information received from the at least one other device to form a final position;
(e) determining, by the device, if the refined position is less than a position tolerance; and
(f) repeating, by the device, steps (c), (d), and (e) based on the determination in step (e).

7. The method of claim 6, further comprising:
(a-2) receiving, by a second device, additional position information from the at least one other device or the first device;
(b-2) modifying, by the second device, an initial position of the second device based on the additional position information from the at least one other device or the first device to form a refined position of the second device;
(c-2) transmitting, by the second device, the refined position of the second device to the other plurality of devices or the first device; and
(d-2) revising, by the second device, the refined position based on additional refined position information received from the at least one other device or the first device to form a final position.

8. The method of claim 7, further comprising:
separating, by the device, the modifying steps (b) and (b-2) and the revising steps (d) (d-2) based on resource availability of a plurality of device; and
transmitting, by the device, the separation of the modifying steps and the revising steps to the plurality of devices.

9. The method of claim 8, wherein the resource availability comprises processor availability, memory availability, network availability, power availability, or any combination thereof.

10. The method of claim 6, wherein the position information comprises a position of the at least one other device, a range between the at least one other device and the device, a directional vector between the at least one other device and the device, or any combination thereof.

* * * * *